United States Patent [19]

Breuer et al.

[11] 3,897,422

[45] July 29, 1975

[54] [(AZIDOMETHYL)THIO]ACETYLCEPH-ALOSPORINS

[75] Inventors: Hermann Breuer; Uwe D. Treuner, both of Regensburg, Germany

[73] Assignee: E. R. Squibb & Sons, Inc.

[22] Filed: Mar. 5, 1973

[21] Appl. No.: 337,804

[52] U.S. Cl. .............................. 260/243 C; 424/246
[51] Int. Cl. ........................................... C07d 99/24
[58] Field of Search ................................ 260/243 C

[56] References Cited
UNITED STATES PATENTS
3,647,788   3/1972   Clark et al. ...................... 260/243 C Primary Examiner—Nicholas S. Rizzo
Attorney, Agent, or Firm—Lawrence S. Levinson; Merle J. Smith

[57] ABSTRACT

New [(azidomethyl)thio]acetylcephalosporins of the following general formula, and their salts,

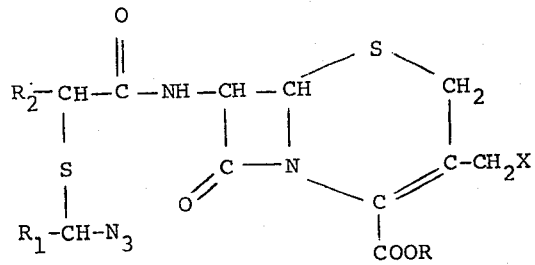

wherein R is hydrogen, lower alkyl, aralkyl, tri(lower alkyl)-silyl, a salt forming ion or the group

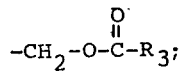

$R_1$ is hydrogen or lower alkyl; $R_2$ is hydrogen, lower alkyl, aryl or a heterocyclic group; $R_3$ is lower alkyl, aryl or aralkyl; and X is hydrogen, hydroxy, lower alkanoyloxy, lower alkoxy, lower alkylthio, lower alkylthiazolylthio, azido, the radical of a nitrogen base, or together X and R represent a bond linking carbon and oxygen in a lactone ring; are useful as antibacterial agents.

9 Claims, No Drawings

[(AZIDOMETHYL)THIO]ACETYLCEPHALOSPORINS

SUMMARY OF THE INVENTION

This invention relates to new antibacterial [(azidomethyl)-thio]acetylcephalosporins which have the formula (I)

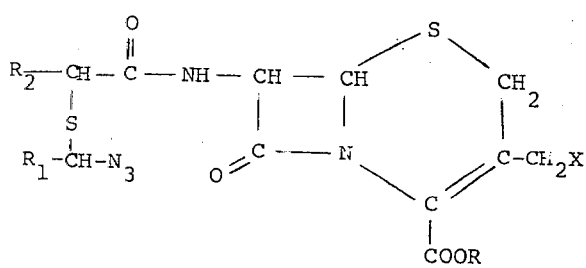

R represents hydrogen, lower alkyl, aralkyl, tri(lower alkyl)silyl, a salt forming ion, or the group

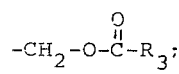

$R_1$ represents hydrogen or lower alkyl; $R_2$ represents hydrogen, lower alkyl, aryl or certain heterocyclic groups; $R_3$ represents lower alkyl, aryl or aralkyl; X is hydrogen, hydroxy, lower alkanoyloxy, lower alkoxy, lower alkylthio, lower alkylthiadiazolylthio, azido or the radical of a nitrogen base. In addition X and R may represent a bond linking carbon and oxygen in a lactone ring.

The preferred members within each group are as follows: R is hydrogen, or a salt forming ion, especially an alkali metal like sodium or potassium; $R_1$ is hydrogen, and the preferred lower alkyl groups are methyl and ethyl; $R_2$ is preferably hydrogen or lower alkyl, especially methyl or ethyl, and X is hydrogen, lower alkanoyloxy, especially acetoxy, lower alkoxy, especially methoxy, lower alkylthio, especially methylthio, or pyridinium.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to seven carbons in the chain, for example, methyl, ethyl, propyl, isopropyl, butyl, isobutyl, t-butyl, amyl or the like, the one to four carbon groups being preferred. The lower alkoxy and lower alkylthio groups contain the same radicals.

The aryl groups are phenyl and simply substituted phenyl containing one or two substituents ($R_5$), preferably only one, such as halogen, lower alkyl, lower alkoxy or hydroxy. The aralkyl groups include phenyl-lower alkyl and those similarly substituted on the phenyl ring as defined above.

The lower alkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The lower alkylthio groups have been defined above. X also represents the radical of an amine, e.g., a lower alkylamine like methylamine, ethylamine, dimethylamine, triethylamine, phenyl-lower alkylamine like dibenzylamine, and pyridine and quinoline quaternaries like pyridinium, 1-quinolinium, 1-picolinium, etc. X and R may also join together, as indicated above, to form a bond linking carbon and oxygen in a lactone ring.

The heterocyclic groups represented by $R_2$ are 5- to 6-membered monocyclic heterocyclic radicals (exclusive of hydrogen) containing nitrogen, sulfur or oxygen in the ring in addition to carbon (not more than two hetero atoms), and members of this group simply substituted. The heterocyclic radicals include pyridyl, thienyl, furyl, oxazolyl, isoxazolyl, thiazolyl and the like as well as the ($R_6$) simply substituted members, especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members.

The salt forming ions may be metal ions, e.g., aluminum, alkali metal ions such as sodium or potassium, alkaline earth metal ions such as calcium or magnesium, or an amine salt ion, of which a number are known for this purpose, for example, phenyl-lower alkylamines like, dibenzylamine, N,N-dibenzylethylenediamine, lower alkylamines like methylamine, triethylamine, procaine, lower alkylpiperidines like N-ethylpiperidine, etc.

The compounds of formula I are produced by acylating a compound of the formula (II)

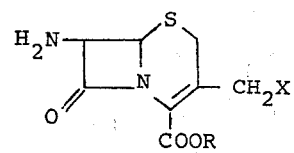

wherein X and R have the meaning defined above, with a reactive derivative of an acid of the formula (III)

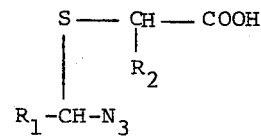

wherein $R_1$ and $R_2$ have the meaning defined above.

The reactive derivatives of the acids of formula III include, for example, acid halides, acid anhydrides, mixed anhydrides of the acid with carbonic acid monoesters, trimethylacetic acid or benzoic acid, acid azides, active esters like cyanomethyl ester, p-nitrophenyl ester or 2,4-dinitrophenylester, or active amides like acylimidazoles.

An acid of formula III may also be reacted with a compound of formula II in the presence of a carbodiimide, for example, N,N-dicyclohexylcarbodiimide, an isoxazolium salt, for example, N-ethyl-5-phenylisoxazolium-3-sulfonate or 2-ethoxy-1,2-dihydroquinoline-1-carboxylic acid ester.

The acids of formula III and their esters of formula VI are new compounds which may be produced by reacting a thioacetic acid ester of the formula (IV)
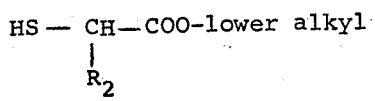

wherein $R_2$ has the meaning defined above and the lower alkyl group is especially methyl or ethyl, with aldehydes in the presence of hydrogen chloride gas. The ester formed by this reaction has the formula (V)
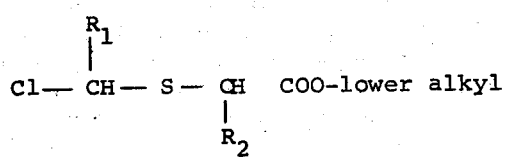

Treatment of the product V with an azide, e.g., an alkali metal azide like sodium azide in an organic solvent like dimethylformamide or acetone, at about ambient temperature, yields an ester of the formula (VI)
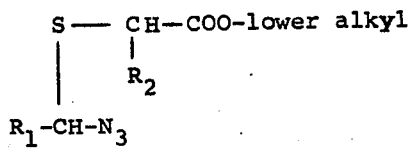

and this is converted, at the conclusion of that reaction, to the free acid of formula III by conventional saponification.

An alternate process for the production of an ester of formula VI or acid of formula III is by the reaction of a compound of the formula (VII)
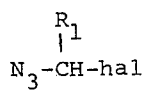

wherein hal is halogen, preferably bromine or chlorine, with a thioacetic acid or ester of the formula (VIII)
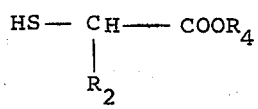

wherein $R_4$ is hydrogen or lower alkyl, in the presence of an acid binding agent, like pyridine, triethylamine or the like.

The acid halide of a compound is formed by treatment with a halogenating agent, e.g., with thionyl chloride at a reduced temperature like 0°C.

When R is the acyloxymethyl group

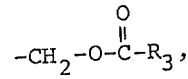

this group may be introduced onto the 7-aminocephalosporanic acid moiety either prior to or subsequent to the reaction with the acylating agent by treatment with one or two moles of a halomethyl ester of the formula (IX)

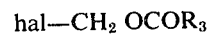

wherein hal is halogen, preferably chlorine or bromine, in an inert organic solvent such as dimethylformamide, acetone, dioxane, benzene or the like at about ambient temperature or below.

The products of this invention form salts which are also part of the invention. Basic salts form with the acid moiety as discussed above when the symbol R is hydrogen.

It will be appreciated that certain of the compounds of this invention exist in various states of solvation as well as in different isomeric or optically active forms. The various forms as well as their mixtures are within the scope of this invention.

Further process details are provided in examples.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or as surface disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 100 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleansing or disinfecting compositions, e.g., for cleaning barns or dairy equipment, at a concentration of about 0.2 to 1% by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same man-

EXAMPLE 1

[(Azidomethyl)thio]acetic acid ethyl ester 16.8 g. (100 mmol.) of [(chloromethyl)thio]acetic acid ethyl ester and 110 mmol. of sodium azide in 100 ml. of dimethylformamide are stirred for 16 hours at room temperature. The reaction mixture is then added to 300 ml. of ice water, whereupon a yellow oil separates. This is separated. The aqueous phase is extracted three times with 50 ml. portions of chloroform, the chloroform extracts are combined and the oil is dried over calcium chloride. Fractional distillation yields 10 g. of the product, [(azidomethyl)thio]acetic acid ethyl ester, as a colorless oil, b.p. 0.4 mm 80°–82°.

EXAMPLE 2

[(Azidomethyl)thio]acetic acid potassium salt 1.72 g. (10 mmol) of [(azidomethyl)thio]acetic acid ethyl ester are dissolved in 30 ml. of ethanol containing 10 mmol. of potassium hydroxide. After stirring for a short time, the potassium salt of [(azidomethyl)thio]acetic acid precipitates as yellow-white crystals, m.p. 161° (dec.) in quantitative yield.

EXAMPLE 3

7-[2-[(Azidomethyl)thio]acetamido]cephalosporanic acid 7.5 g. (40 mmol.) of [(azidomethyl)thio]acetic acid potassium salt are dissolved in 50 ml. of water and acidified with 2N hydrochloric acid. After drying over sodium sulfate, extraction with ether gives an ether solution of [(azidomethyl)thio]acetic acid. Without isolating the last named product, 50 mmol. of thionyl chloride are added at 0° and the mixture stirred for 30 minutes. Removal of the ether and excess thionyl chloride under vacuum leaves [(azidomethyl)thio]-acetyl chloride as a yellow oil which is used further in this crude form. 20 mmol. of 7-aminocephalosporanic acid and 50 mmol. of triethylamine are dissolved in 100 ml. of methylene chloride and this is cooled to −30°. Into this is dropped the crude [(azidomethyl)thio]acetyl chloride dissolved in a little methylene chloride. The mixture is stirred for 30 minutes and 50 ml. of 2N hydrochloric acid are added. After a short time 1.4 g. of crude 7-[2-[(azidomethyl)thio]-acetamido]cephalosporanic acid crystallize. From the organic phase, after distilling off the solvent, an additional 3.5 g. of product are obtained. Recrystallization from chloroformcarbon tetrachloride gives the product as a yellow-white powder, m.p. 122° (dec.).

EXAMPLE 4

The potassium salt of the product of Example 3 is obtained from the free acid as a white crystalline monohydrate by treatment of the acid with an equivalent amount of potassium carbonate and freeze drying the aqueous solution, m.p. 140° (dec.).

EXAMPLE 5

7-[2-[(Azidomethyl)thio]acetamido]-3-desacetoxycephalosporanic acid

By substituting 7-amino-3-desacetoxycephalosporanic acid for the 7-aminocephalosporanic acid in the procedure of Example 3, 7-[2-[(azidomethyl)thio]acetamido]-3-desacetoxycephalosporanic acid is obtained and then its potassium salt is obtained by the procedure of Example 4.

EXAMPLE 6

To obtain the triethylamine salt of 7-[2-[(azidomethyl)-thio]acetamido]cephalosporanic acid, an equivalent amount of triethylamine is added to an ethanol solution of 7-[2-[(azidomethyl)thio]acetamido]cephalosporanic acid and the reaction product is concentrated at reduced pressure to deposit the product.

The following additional products are obtained according to the procedure of Examples 3 and 4 by substituting for the 2-[(azidomethyl)thio]acetyl chloride the appropriately substituted derivative and, when X is other than acetoxy, substituting the appropriately substituted 7-aminocephalosporanic acid or 7-amino-3-desacetoxycephalosporanic acid.

TABLE

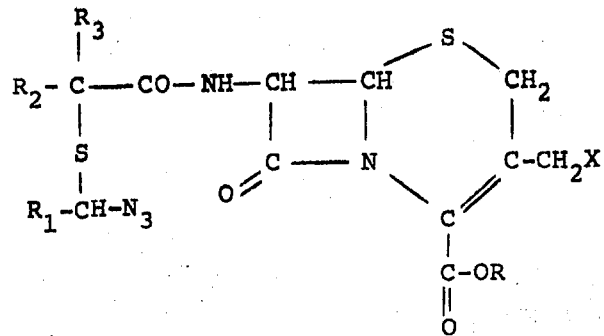

Table — Continued

| Example | R | $R_1$ | $R_2$ | X |
|---|---|---|---|---|
| 9 | $C_2H_5$ | $C_2H_5$ | $CH_3$ | OH |
| 10 | H | $C_2H_5$ | $C_3H_7$ | pyridinium |
| 11 | $-CH_2O\overset{O}{\overset{\|}{C}}-CH(CH_3)_2$ | H | $C_6H_5$ | $OCOCH_3$ |
| 12 | $-CH_2O\overset{O}{\overset{\|}{C}}-C_6H_5$ | $C_2H_5$ | $4-ClC_6H_4-$ | $OCOCH_3$ |
| 13 | K | H | $3,4-(CH_3O)_2C_6H_3-$ | H |
| 14 | $C_2H_5$ | $CH_3$ | $3,4,5-(CH_3O)_3C_6H_2-$ | $OCOCH_3$ |
| 15 | H | $-CH_3$ | $4-CH_3C_6H_4-$ | $OCOCH_3$ |
| 16 | lactone (+X) | $C_2H_5$ | $3,4-(Br)_2C_6H_3-$ | lactone (+R) |
| 17 | K | H | $2,4-(Cl)_2C_6H_3-$ | $OCOCH_3$ |
| 18 | K | H | ![isoxazole with $C_6H_5$ and $CH_3$] | $OCOCH_3$ |
| 19 | $C_2H_5$ | $C_2H_5$ | $C_6H_5-$ | $OCOCH_3$ |
| 20 | Na | H | ![5-methylpyridin-2-yl] | $OCOCH_3$ |
| 21 | $C_2H_5-$ | $CH_3$ | ![thienyl] | $OCOCH_3$ |
| 22 | $C_6H_5CH_2-$ | H | ![furyl] | $OOCH_2C_6H_5$ |
| 23 | $-CH_2O\overset{O}{\overset{\|}{C}}-CH(CH_3)_2$ | $CH_3$ | $C_6H_5-$ | $N_3$ |
| 24 | $-CH_2O-\overset{O}{\overset{\|}{C}}-CH(CH_3)_2$ | H | $C_2H_5-$ | $-OOC-C_6H_5$ |
| 25 | H | H | $C_6H_5-$ | H |
| 26 | Na | $CH_3$ | $C_2H_5-$ | H |

Table —Continued

| Example | R | $R_1$ | $R_2$ | X |
|---|---|---|---|---|
| 27 | H | H | $C_6H_5-$ | $-OCOCH_3$ |
| 28 | $-Si(CH_3)_3$ | $C_3H_7$ | $C_2H_5-$ | H |
| 29 | $-N(C_2H_5)_3$ | $CH_3$ | $C_6H_5-$ | H |
| 30 | Na | $C_2H_5$ | $C_6H_5-$ | $-OCOCH_3$ |
| 31 | K | H | $C_2H_5$ | $-SCH_3$ |
| 32 | H | H | 4-pyridyl | $-OCH_3$ |
| 33 | $-CH_2OCOC_6H_5$ | H | $CH_3-C_6H_4-$ | H |
| 34 | K | $CH_3$ | 2-furyl | H |
| 35 | H | H | $C_2H_5$ | $-OCOCH_3$ |
| 36 | H | H | H | $OCOCH_3$ |
| 37 | K | $C_2H_5$ | $CH_3$ | H |
| 38 | H | H | $C_3H_7$ | $OCOCH_3$ |
| 39 | H | H | $C_6H_5-$ | pyridinium |
| 40 | K | $C_2H_5$ | $C_6H_5$ | $SC_2H_5$ |
| 41 | K | $CH_3$ | $CH_3$ | $OCOCH_3$ |
| 42 | H | $CH_3$ | $HO-C_6H_4-$ | H |
| 43 | H | H | H | $OCH_3$ |
| 44 | K | H | H | $OCH_3$ |
| 45 | H | H | H | $SCH_3$ |
| 46 | K | H | H | $SCH_3$ |
| 47 | K | H | H | $-S-(5-methyl-1,3,4-thiadiazol-2-yl)$ |

EXAMPLE 48

A sterile powder for reconstitution for use intramuscularly is prepared from the following ingredients which supply 1000 vials each containing 250 mg. of active ingredient:

| | |
|---|---|
| 7-[2-[(azidomethyl)thio]acetamido]-cephalosporanic acid, sterile | 250 gm. |
| Lecithin powder, sterile | 50 gm. |
| Sodium carboxymethylcellulose, sterile | 20 gm. |

The sterile powders are aseptically blended and filled into sterile vials, and sealed. The addition of 1 ml. of water for injection to the vial provides a suspension for intramuscular injection.

What is claimed is:

1. A compound of the formula

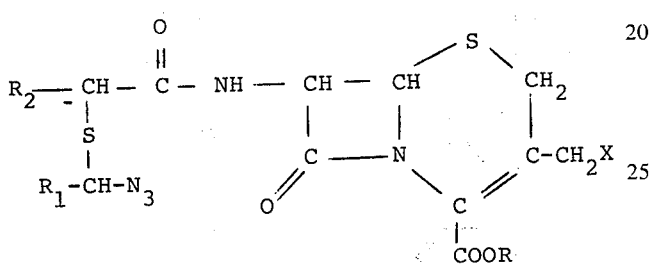

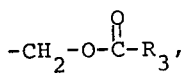

alkali metal, alkaline earth metal or lower alkylamine; $R_1$ is hydrogen or lower alkyl; $R_2$ is hydrogen, lower alkyl, phenyl, thienyl, furyl or pyridyl; $R_3$ is lower alkyl, phenyl or phenyl-lower alkyl; and X is hydrogen, hydroxy, lower alkanoyloxy, lower alkoxy or lower alkylthio.

2. A compound of the formula

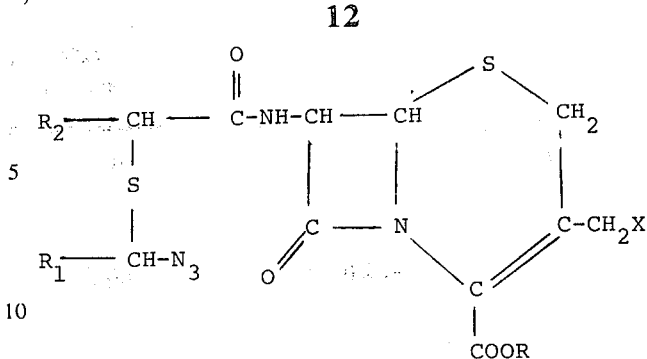

wherein R is hydrogen, lower alkyl, phenyl-lower alkyl, tri-(lower alkyl)silyl, $$-CH_2-O-\overset{O}{\underset{\|}{C}}-R_3$$

or a salt forming ion of the group consisting of alkali metal, alkaline earth metal, lower alkylamine, phenyl-lower alkylamine or lower alkylpiperidine; $R_1$ and $R_2$ each is hydrogen or lower alkyl; $R_3$ is lower alkyl, phenyl or phenyl-lower alkyl; and X is hydrogen, hydroxy or lower alkanoyloxy.

3. A compound as in claim 2 wherein R is hydrogen or alkali metal, $R_1$ and $R_2$ each is hydrogen or lower alkyl, and X is hydrogen or lower alkanoyloxy.

4. A compound as in claim 2 wherein $R_1$ and $R_2$ each is hydrogen.

5. A compound as in claim 4 wherein R is hydrogen or alkali metal and X is hydrogen, acetoxy, methoxy or methylthio.

6. A compound as in claim 2 wherein R, $R_1$, $R_2$ and X each is hydrogen.

7. Alkali metal salt of the compound of claim 6.

8. A compound as in claim 2 wherein R, $R_1$ and $R_2$ each is hydrogen and X is acetoxy.

9. Alkali metal salt of the compound of claim 8.

* * * * *